INVENTORS
WALLACE P. CHASE
WILLIAM ROBERT DAVIS
BY JOHN EDWARD SNYDER

ATTORNEY

United States Patent Office 2,917,732
Patented Dec. 15, 1959

2,917,732

DETECTOR FOR INDICATING PRESENCE OF OBJECTS

Wallace P. Chase, La Canada, William Robert Davis, Glendale, and John Edward Snyder, Van Nuys, Calif., assignors to Librascope, Incorporated, Glendale, Calif., a corporation of California Application March 22, 1957, Serial No. 647,770

27 Claims. (Cl. 340—258)

The present invention relates in general to an improved system for detecting magnetically the presence of a metallic object in a given area. More particularly, the invention relates to an improved system for detecting magnetically the passage of or temporary presence of an electrically conductive body.

For example, at the present time, apparatus using pneumatic or mechanical switching devices extending across or embedded in the pavement have been widely used for detecting the passage of vehicles over a roadway. Such apparatus, however, has not been completely successful for certain reasons. This type of apparatus is subject to wear, and therefore requires continual servicing and maintenance. Also, the mechanical and pneumatic types of equipment are subject to weather conditions and are liable to be rendered inoperative in the presence, for example, of snow or ice and in the event of excessive rain.

Magnetically inductive instruments have heretofore been proposed for the purposes of detecting traffic. One objection to these devices is that they are sensitive only to objects moving past the detector above certain speeds. Other such instruments have entailed relatively complicated control equipment and required constant attention and adjustment due to variations in their circuit parameters as atmospheric and other conditions change.

The present invention provides a detecting system of the magnetic induction type. The system of the invention in common with other magnetic systems of this general type has the advantage in that it does not require any mechanical moving parts for detection. This enables the actual detecting portion of the apparatus to be buried and sheltered beneath the surface.

One factor that must be compensated in equipment of the magnetic induction type is the effect of moisture on the buried detecting portion of the apparatus. In the described embodiment of the present invention, the detecting portion is actually the tank coil of an oscillator. Varying moisture conditions contiguous to the tank coil can produce spurious loading which, in turn, is capable of placing the equipment out of adjustment and of producing spurious readings on the indicator included in the equipment. In a manner to be described, the effects of such varying moisture conditions are eliminated in the system and apparatus of the present invention.

The tank coil of the oscillator in accordance with the present invention is preferably encapsulated in a suitable moisture resistant coating. The residual effects of moisture absorption in the apparatus of this invention are taken care of by an electrical control which is incorporated in the system of the invention and which renders the system immune to these effects. Therefore, any moisture loading on the tank coil of the apparatus of the invention has no adverse effect on the adjustment of the apparatus and does not produce spurious readings in the indicator associated with the apparatus.

Another factor which has militated against the convenient automatic and unattended operation of prior magnetic induction types of traffic detector equipment has been the effect of temperature changes on tne buried detecting portion of the apparatus and on the associated control portion of the apparatus. To slow down and retard the effect of rapid temperature changes in the apparatus constituting this invention, the sensitive components of the system of the invention are housed in containers composed, for example, of polyurethane which produces relatively large thermal delays. The effects of temperature changes on the equipment are adequately compensated by the control referred to above, and the system continues to operate accurately and efficiently even in the presence of such temperature changes.

The control equipment of the present invention may conveniently be constructed to utilize transistors and diodes. Likewise, any changes in the characteristics of such transistors or diodes with time or temperature are compensated in the system of the invention. In short, therefore, the invention provides an improved magnetic induction type of traffic detector which is capable of unattended operation over long periods of time and under widely varying temperature and moisture conditions.

As noted briefly above, the system of the invention in one embodiment includes an oscillator, and the tank coil of the oscillator serves as the detecting portion for the apparatus. The tank coil, therefore, is adapted in most installations to be positioned under the roadbed over which the traffic conditions are to be determined. A constant current generator is associated with the oscillator, in a manner to be described, to maintain a constant current through the tank coil in the presence of varying load conditions. Then, when an electrically conductive object appears in the field of the tank coil, the tank coil becomes loaded and its "Q" decreases in value such that there is a demand for an additional flow of current through the tank coil. The constant current source, however, tends to hold the current constant through the tank coil so that the amplitude of the oscillatory output voltage produced across the tank coil is decreased. This decrease occurs, therefore, each time a vehicle passes through the field of the tank coil.

The signals from the oscillator are introduced to a peak detector which produces in each cycle an output voltage having an amplitude related to the output signals. The pulses from the detector are in turn introduced to first and second trigger circuits such as monostable multivibrators. Each of the trigger circuits is provided with characteristics to have first and second states of operation. The trigger circuits have their first states of operation upon the introduction from the detector of pulses having an amplitude less than a particular value. Such pulses are produced in the second trigger circuit in the absence of an automobile. Similarly, the trigger circuits have the second state of operation when pulses having an amplitude greater than the particular value are introduced to the trigger circuits from the detector. The particular amplitudes of the pulses are different for each of the trigger circuits.

First and second relays are respectively associated with the first and second trigger circuits to become energized when the associated trigger circuit is in the second state of operation. Each relay controls the operation of a single-pole double-throw switch. When the second relay is in its first state of operation corresponding to the absence of a vehicle, the switches establish a continuous circuit to a servomotor.

The servomotor operates in one direction in the de-energized state of the first relay and operates in an opposite direction in the energized state of the relay. The servomotor is coupled to the peak detector to control the operation of the detector. In this way, the servomotor operates in the absence of a vehicle to regulate the operation of the peak detector such that the pulses from the detector are maintained at substantially the first level.

Upon the movement of a vehicle or other electrically conductive object into the vicinity of the tank coil, the first and second switches become actuated by their associated relays into their second state of operation. In the second state of the second switch, the continuous circuit to the servomotor becomes interrupted so that the servomotor cannot perform a regulatory action on the amplitude of the output pulses. At the same time, a continuous circuit becomes established to an output indicator by a second switch. By counting the number of output indications, the number of vehicles moving along a road past the tank coil can be determined.

In the drawings:

Figure 4 is a modified control for one of the stages of the system shown in Figure 3.

Figure 1:
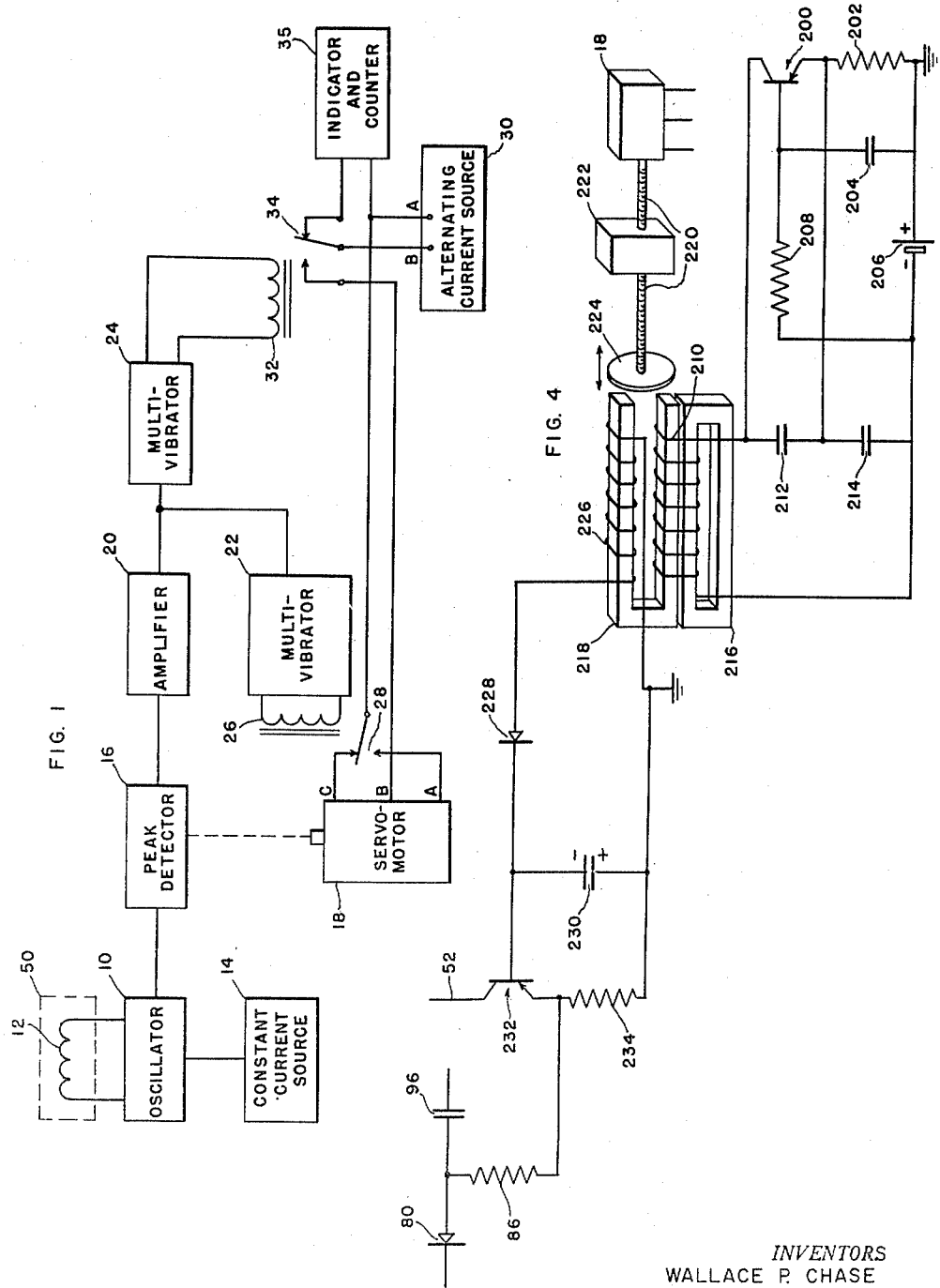
Figure 1 is a block diagram of one embodiment of the improved vehicle detector system of the present invention.

The system of Figure 1 includes an oscillator 10. This oscillator, in a manner to be described, may be a transistor version of a Colpitts oscillator, or it may have any other circuit configuration. The frequency determining circuit or tank coil of the oscillator 10 is indicated at 12. The system operates to indicate the presence of a vehicle or othere metallic article when such a vehicle comes within the influence of the magnetic field of the tank coil 12. This tank coil, as previously mentioned, is adapted to be positioned under the roadbed where the detection is to be made. As has been also pointed out previously, the tank coil 12 is preferably embedded in a resin such as a suitable epoxy and is then placed in a non-absorbent concrete housing just under the surface of the pavement.

A constant current source 14 is coupled to the oscillator 10. The source 14 serves to maintain a constant current through the tank coil 12 when the tank coil is loaded by the presence of a vehicle or other electrically conductive article in its magnetic field. The construction and operation of the source 14 will be subsequently described in greater detail.

The output terminal of the oscillator 10 is coupled to a peak detector 16. The peak detector includes a variable bias control which is under the control of a servomotor 18. When the servomotor is rotated in one direction, the bias control of the peak detector 16 moves to increase the amplitude of the pulses produced by the peak detector. Alternately, when the servomotor 18 is rotated in the opposite direction, it controls the biasing control of the peak detector to decrease the amplitude of these pulses.

The peak detector 16 is coupled to an amplifier 20. The amplifier, in turn, is coupled to a multivibrator 22 and to a multivibrator 24. The multivibrators 22 and 24 are of the monostable type. That is, the multivibrators are each constructed to be triggered to an astable state upon the receipt of a pulse exceeding a selected amplitude threshold. A sequence of such pulses may serve to hold the particular multivibrator in its astable state. However, whenever the amplitude of such pulses drops below the selected threshold, and after a predetermined time delay established by the parameters of the multivibrator circuit, the particular multivibrator returns to its stable state.

The output terminals of the multivibrator 22 are connected to the energizing coil 26 of a control relay. This coil is energized by the multivibrator 22 whenever the multivibrator is triggered to its astable state. The relay winding 26 controls a double-throw relay switch 28. The armature of the relay switch 28 is biased into engagement with its upper fixed contact (line c) when the relay winding is energized, and the armature is spring biased into engagement with its fixed contact (line a) when the relay winding 26 is not energized.

The servomotor 18 has three input terminals which are designated as "A," "B" and "C." The arrangement is such that when an alternating voltage is introduced across the terminals "A" and "B" the servomotor is driven in one rotational direction, and when the alternating voltage is introduced across the terminals "B" and "C" it is rotated in the opposite direction. The terminal "C" of the servomotor is connected to the upper fixed contact of the relay switch 28, and the terminal "A" is connected to the lower fixed contact of that relay switch. The armature of the relay switch is connected to the terminal "A" of an alternating-current source 30.

The output terminals of the multivibrator 24 are connected to the energizing winding 32 of a control relay to energize this winding when the multivibrator is triggered to its astable state. The winding 32 controls a double-throw relay switch 34. When the relay winding 32 is energized, the armature of the switch 34 engages the left fixed contact of the switch, and when the winding 32 is not energized, the armature 34 is spring-biased into engagement with the right fixed contact of the switch.

The armature of the relay switch 34 is connected to the terminal "B" of the alternating-current source 30. The left fixed contact of the relay switch 34 is connected to the terminal "B" of the servomotor 18. The right fixed contact of the relay switch 34 is connected to one terminal of an indicator and counter unit 35, the other terminal of this unit being connected to the terminal "A" of the alternating current source. The unit 35 may have any known construction and serves to render a visual or aural indication whenever an alternating voltage is introduced across its input terminals. The unit also includes a counter of known construction which serves to count the vehicles detected by the system, a unit count being made each time upon the introduction of an alternating voltage across its input terminals.

When the system Figure 1 is placed in an operating condition, and in the absence of a vehicle in the magnetic field of the tank coil 12, the oscillator 10 oscillates at a predetermined frequency, and the oscillatory output voltage from the oscillator appears across the tank coil 12 with a predetermined amplitude. This oscillatory output voltage is indicated by the curve "A" of Figure 2, and the voltage has its predetermined amplitude referred to above in the "no vehicle" portion of the curve.

The oscillatory voltage from the oscillator 10 is applied to the peak detector 16. The peak detector serves to rectify the voltage and to produce a series of negative-going pulses shown in the curve "B" of Figure 2. When no vehicle is present, these pulses have a certain amplitude which is dependent upon the amplitude of the signal from the oscillator 10 and also upon the adjustment of the bias of the peak detector by the servomotor 18. The output pulses from the peak detector 16 are introduced to the amplifier 20, where they are amplified and sharpened to produce the positive-going pulses of curve "C" to Figure 2. These positive-going pulses from the amplifier 20 are introduced to the multivibrator 22. The latter pulses originally have an amplitude which exceeds the preselected firing threshold of the multivibrator 22, and they trigger the multivibrator to its astable condition. Moreover, the repetition frequency of the pulses is such that they maintain the multivibrator 22 triggered in its astable state. To effect this, the time constant of the multivibrator 22 is made slightly longer than the interval between successive pulses from the amplifier 20. So long as the multivibrator 22 is maintained in its astable state, the relay winding 26 is energized and the armature 28 is moved into engagement with its upper fixed contact. This effectively connects the terminal "C" of the servomotor 18 to the terminal "A" of the alternating-current source 30.

The positive-going amplified pulses from the amplifier 20 are also introduced to the multivibrator 24. As shown in the curve "D" of Figure 2, these pulses have an amplitude which exceeds the trigger threshold of the multivibrator 24 when no vehicle is present in the field of the tank coil 12. The time constant of the multivibrator 24, likewise, is made slightly longer than the interval between successive pulses from the amplifier 20. The multivibrator 24, therefore, is triggered to its astable state by the pulses and is held by them in that state.

So long as the multivibrator 24 is held in its astable state, the relay winding 32 is energized. This causes the armature of the relay switch 34 to engage the right fixed contact of that switch. This effectively connects the common terminal "B" of the servomotor 18 to the terminal "B" of the alternating-current source 30. At the same time, the armature of the relay switch 34 is out of engagement with its right fixed contact so that the indicator and counter unit 35 is not activated.

Under the conditions described above, when both the multivibrators 22 and 24 are in their astable states, an alternating voltage is introduced across the terminals "B" and "C" of the servomotor 18. This causes the servomotor to rotate in a direction to adjust the bias of the peak detector 16 so as to reduce the output pulses from the peak detector. This reduction continues until the amplitude of the pulses from the amplifier 20 falls below the trigger threshold of the multivibrator 22. This causes the relay winding 26 to become de-energized so that the armature of the relay switch 28 moves into engagement with its lower fixed contact. This changes the connection to the alternating-current source 30 so that the alternating voltage is now introduced across the terminals "A" and "B" of the servomotor 18. This latter connection causes the servomotor 18 to rotate in the opposite direction.

The rotation of the servomotor 18 in the opposite direction produces a shift in the bias of the peak detector 16 so as to increase the output pulses from the peak detector. The amplitude of the pulses from the amplifier 20 now increases past the trigger threshold of the multivibrator 22 again to trigger that multivibrator to its astable state and again to change the connection to the servomotor 18. During this time, the amplitude of the pulses introduced to the multivibrator 24 does not fall below the trigger threshold of that multivibrator since the amplitude of the pulses introduced to the multivibrator 24 is proportionately greater than the amplitude of the pulses introduced to the multivibrator 22. The multivibrator 24, therefore, is held in its astable state to maintain the relay winding 32 energized and to maintain the connection from the terminal "B" of the servomotor 18 to the terminal "B" of the alternating-current source 30. By maintaining the multivibrator 24 in its astable state, the switch 34 is actuated by the coil 32 into a position to prevent a continuous circuit from being established to the indicator and counter 35. In this way, no output indication can be provided by the counter 35.

In the manner described above, therefore, the servomotor 18 serves to control the peak detector 16 so that the output pulses from the peak detector are maintained at a fixed amplitude. This control maintains the output pulses at a particular amplitude which is independent of minor changes in the amplitude of the oscillatory output voltage from the oscillator 10 and which is also independent of slow changes in the parameters of the various components included in the system. Therefore, the indicator 35 is held de-energized by the system despite the fact that various ambient conditions and circuit parameters may change. The changes in circuit parameters may result from various factors including aging of components and changes in ambient temperature.

Therefore, even though varying moisture conditions may produce gradual loading changes on the tank coil 12 of the oscillator, or varying temperature conditions may produce gradual amplitude changes in the oscillatory voltage from the oscillator 10, the output pulses from the peak detector 16 are maintained at a fixed amplitude level. Any tendency for the amplitude of these output pulses from the detector 16 to increase above that level causes the servomotor 18 to be activated in the described manner to control the bias of the peak detector and return the amplitude of the pulses to the particular level. In like manner, any tendency for the amplitude of the pulses from the peak detector 16 to decrease below the predetermined level produces a compensating control on the servomotor 18 to return the amplitude of the pulses to that level.

Now, when a vehicle or other electrically conductive object comes under the influence of the magnetic field of the tank coil 12, it produces a rapid and considerable loading effect on that coil. This loading effect tends to produce a decrease in the "Q" of the coil 12 so as to demand additional current from the oscillator 10. However, the constant current source 14 maintains the current in the coil 12 essentially constant. The effect, therefore, is a considerable decrease in the oscillatory output voltage appearing across the tank coil 12. This considerable decrease in the oscillatory output voltage is shown in the curve "A" in Figure 2 under the portion of the curve designated as "vehicle."

Before the multivibrator 22 has an opportunity to respond to the resulting drop in the amplitude of the output pulses from the amplifier 20, the amplitude of the pulses from the amplifier 20 falls below the trigger threshold of the multivibrator 24. This is shown in the curve "D" of Figure 2. The multivibrator 24, therefore, returns to its stable condition and the relay winding 32 is de-energized. This causes the armature of the relay switch 34 to break its engagement with its fixed contact. This breaks the connection to the "B" terminal of the servomotor 18 and disconnects the servomotor from the alternating-current source 30. Therefore, the operating bias of the peak detector 16 remains where it was just prior to the presence of the vehicle, and no control effect is developed to compensate the detector 16 for the reduced amplitude of the output pulses.

Figure 2:
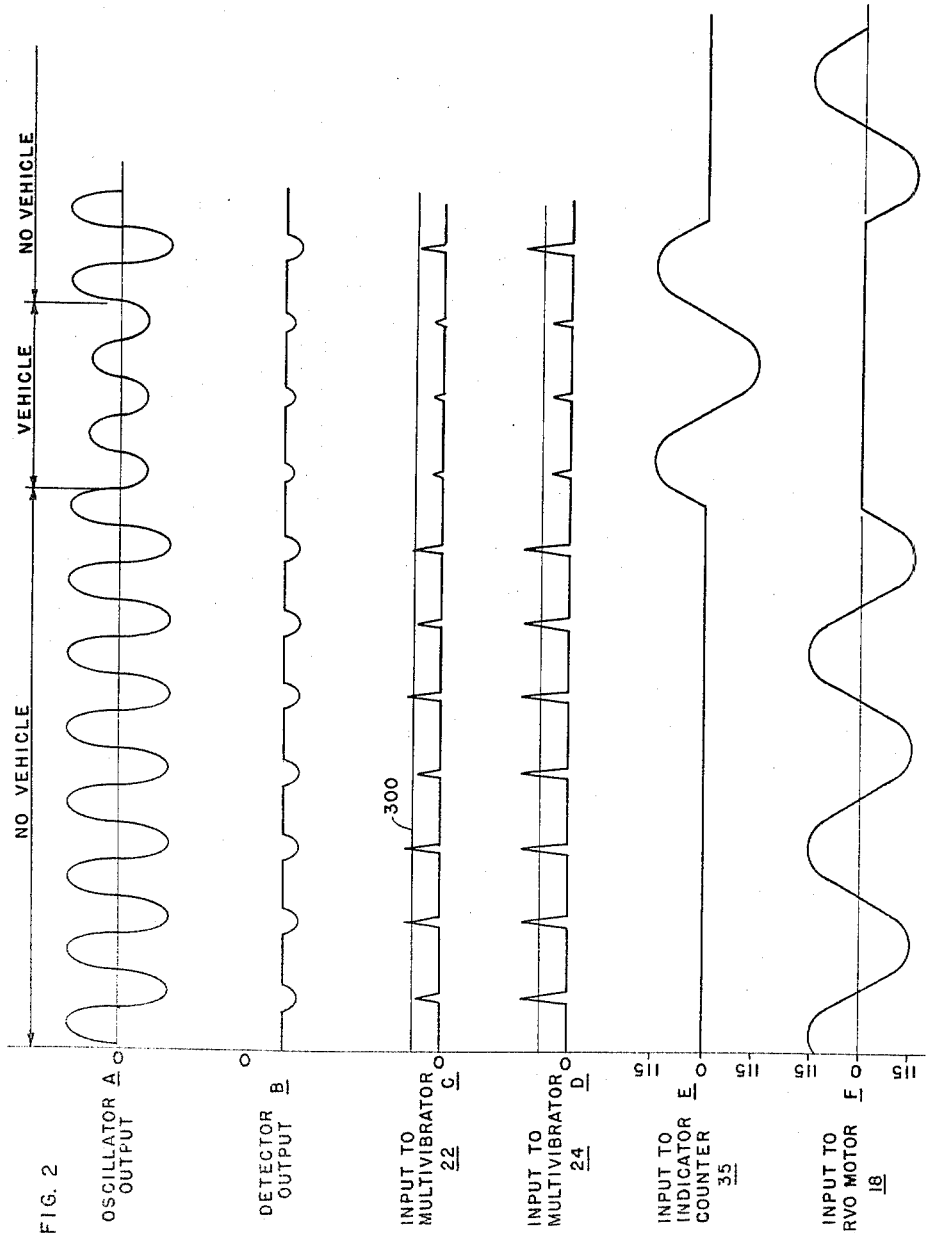
Figure 2 illustrates a plurality of curves which are useful in explaining the operation of the embodiment of the invention shown in Figure 1.

The engagement of the armature of the relay switch 34 with its right fixed contact connects the unit 35 to the alternating-current source 30 and causes an alternating voltage, as shown by the curve "E" of Figure 2, to be introduced across its input terminals. This occurs at the same time that the alternating voltage shown in the curve "F" in Figure 2 is cut off from the servomotor 18. The introduction of the alternating voltage to the indicator and counter unit 35 causes that unit to indicate the presence of a vehicle and also causes the unit to make a single count as long as the voltage is impressed on it.

As the vehicle leaves the magnetic field of the tank coil 12, the oscillatory output voltage from the oscillator 10 resumes its original amplitude, and the system returns to its "no vehicle" condition. The detector system of Figure 1, therefore, responds to the passage of a vehicle through the magnetic field of the tank coil 12 to indicate and count the presence of that vehicle. The count may be increased by an integer of "1" every time that a motor vehicle enters the magnetic field of the tank coil 12.

Figure 3:
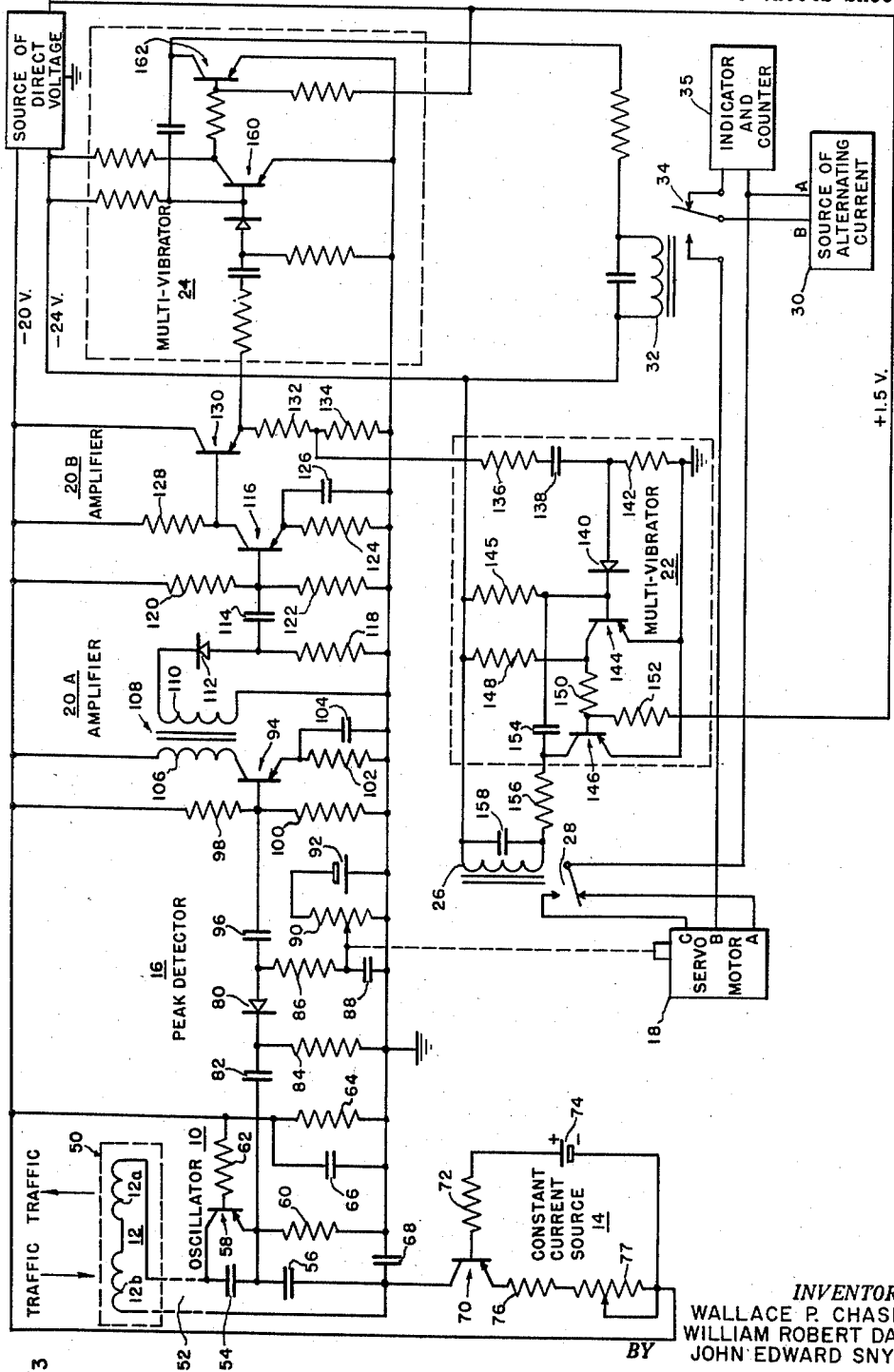
Figure 3 is a circuit diagram of one embodiment of the invention corresponding to the block diagram of Figure 1, the system of Figure 3 including transistors and diodes as components of the detector system.

In the circuit diagram of Figure 3, the tank coil 12 is shown to have two series-connected sections 12a and 12b which are adapted to be disposed on opposite lanes of the roadway. Then, the section 12a is able to detect the traffic travelling in one direction, and the section 12b is able to detect the traffic travelling in the other direction. Each of these sections may have an inductance, for example, of 25 millihenries. As previously noted, the tank coil 12 is embedded in a suitable housing 50 which preferably is composed of non-absorbent concrete.

The tank coil 12 is connected to the oscillator circuit 10 by a suitable electrical conduit 52. A pair of capacitors 54 and 56 are connected across the tank coil 12 in a manner similar to that previously described and shown by Colpitts. The capacitor 54 may, for example, have a value of .05 microfarads, and the capacitor 56 may have a value of 1 microfarad. A transistor 58 is included in the oscillator circuit, and this transistor may be of the P-N-P type such as is presently designated "2N104." The collector electrode of the transistor 58 is connected to the side of the capacitor 54 remote from the capacitor 56. A resistor 60 is connected between the emitter of the transistor 58 and ground. This resistor, for example, may have a value of 1 kilo-ohm.

The base electrode of the transistor 58 is connected to resistor 62. Resistor 62 is connected to resistor 64 which in turn is connected to the —20 volt power supply at their common junction. The other side of resistor 64 is connected to the ground. The resistor 62 may have a value of 82 kilo-ohms and the resistor 64 may have a value of 27 kilo-ohms. The resistor 64 is shunted by a capacitor 66 having a value, for example, of 5 microfarads. The negative voltage source is designated as —20 volts for the particular transistor referred to above. This source is a stabilized source of direct voltage and may be constructed in accordance with known practices.

A capacitor 68 is connected between the side of the capacitor 56 remote from the capacitor 54 and ground. The capacitor 68 has a value, for example, of 1 microfarad.

The transistor 58 and the associated circuitry described above are included in a known oscillator circuit of the Colpitts type. As oscillatory output voltage appears across the tank coil 12, and a portion of this oscillatory output voltage appears across the emitter resistor 60, the emitter electrode being connected to the junction between the capacitors 54 and 56 to complete the oscillator circuit.

The constant current source 14 includes a transistor 70. This transistor is of the N-P-N type, such as is presently designated a 2N35. A resistor 72 and direct voltage source 74 are connected in series between the base of the transistor 70 and the negative terminal of the —20 voltage source referred to above. The voltage source 74 may be a 1.3 volt mercury cell, for example, and its positive terminal is connected to the resistor 72. The collector of the transistor 70 is connected to the common junction between the capacitors 56 and 68 in the oscilalter 10. A resistor 76 has one terminal connected to the emitter electrode of the transistor 70. The other terminal of the resistor is connected to a fixed terminal of a manually adjustable rheostat 77. The other fixed terminal of the rheostat 77 is connected to the —20 v. negative voltage source referred to above, and the movable arm of the rheostat is connected to this latter fixed terminal of the potentiometer. The resistor 76 may, for example, have a value of 640 ohms, and the rheostat 77 may have a maximum value of 5 kilo-ohms.

The voltage source 74 biases the transistor 70 in the forward direction so that a current flows between its base and its emitter. This current flow produces across the resistor 76 and the rheostat 77 a voltage drop which tends to limit this current flow. The current flow from the base to the emitter of the transistor 70 produces a current flow between the collector and base in accordance with known transistor operating principles. The oscillator circuit produces a load on the collector. The current flow through the emitter and base adjusts itself in accordance with the oscillator load and the values of the resistance 76 and the rheostat 77 to produce a certain load current through the collector.

Now, should the tank coil 12 become loaded, its inductance would decrease such that the current through the oscillator 10 and the transistor 70 would tend to increase. However, any tendency for increased current flow through the transistor 70 produces a corresponding increased voltage drop across the emitter resistor 76 and the rheostat 77. This increased voltage drop tends to reduce any tendency for the increased current flow in the base bias circuit. Therefore, the circuit of the transistor 70 operates to oppose any change in the current flowing through the transistor collector circuit. This opposition is especially predominant because the impedance provided by the transistor 70, the resistance 76 and the rheostat 77 is considerably higher than the impedance provided by the tank coils 12.

Therefore, any loading on the oscillator tank coils 12 due to the presence of a vehicle tends to demand increased current. However, this demand for increased current is opposed by the constant current source 14. Because of this opposition and because of the decreased inductance of the tank coil 12 in the presence of a vehicle, a drop is produced in the amplitude of the oscillatory output voltage appearing across the tank coil 12 and across the resistor 60. This drop in oscillatory output voltage is used in the manner described above to control the indicator and counter unit 35.

The peak detector 16 includes a diode 80. This diode may be a selenium type such as presently designated as a "1N100." A capacitor 82 couples the emitter of the transistor 58 to the cathode of the diode 80. A resistor 84 is connected between the cathode of the diode 80 and ground. The capacitor 82 may have a value, for example, of .1 microfarad, and the resistor 84 may have a resistance of 2 kilo-ohms. A resistor 86 and a series-connected capacitor 88 are connected between the anode of the diode 80 and ground. The resistor 86 may have a value of 10 kilo-ohms, and the capacitor 88 may have a value of 10 microfarads. The common junction between the resistor 86 and the capacitor 88 is connected to the movable arm of a potentiometer 90. One fixed contact of the potentiometer is grounded, and the other fixed contact is connected to the negative terminal of a bias source 92. The positive terminal of this source is grounded. The movable arm of the potentiometer 90 is controlled by the servomotor 18, as indicated by a broken line in Figure 3.

The anode of the diode 80 is negatively biased by the circuit including the potentiometer 90 and battery or bias source 92. Because of this negative bias, the diode 80 conducts only on the negative peaks of the oscillatory output signal appearing across the resistor 60. When the diode 80 becomes conductive, the voltage on the plate of the diode tends to fall to the potential appearing on the cathode of the diode. This causes a plurality of negative pulses to be produced across the resistor 86 and across the lower portion of the potentiometer 90. The amplitude of these pulses is controlled by the setting of the movable arm of the potentiometer. This setting in turn controls the negative back bias to the diode 80 and determines the level at which it clips the peaks of the oscillatory output voltage appearing across the resistor 60.

The amplifier 20 of Figure 1 has two stages which are represented by 20a and 20b in Figure 3. The amplifier 20a includes a transistor 94 which may be of the N-P-N type such as is presently designated as "2N104." A coupling capacitor 96 is connected between the anode of the diode 80 and the base electrode of the transistor 94. The capacitor 96 may have a value, for example, of .005 microfarads. The base electrode of the transistor 94 and the capacitor 96 are connected to the common junction between a pair of resistors 98 and 100. These resistors are connected as a voltage divider between the −20 volt source and ground. The resistor 98 may have a value of 82 kilo-ohms, and the resistor 100 may have a value of 47 kilo-ohms.

A resistor 102 is connected between the emitter of the transistor 94 and ground, and this resistor is shunted by a capacitor 104. The resistor 102 may have a value of 5.1 kilo-ohms and the capacitor 104 may have a value of 5 microfarads. The collector electrode of the transistor 94 is connected to one terminal of the primary winding 106 of a coupling transformer 108. The other terminal of the primary winding is connected to the −20 volt source. The pulses from the peak detector 16 are sharpened somewhat by the input circuit of the transistor 94, and they are amplified by the circuit of the transistor.

One terminal of the secondary 110 of the transformer 108 is grounded, and the other terminal is connected to the cathode of a diode 112. The anode of the diode is connected to one side of a coupling capacitor 114, and the other side of this coupling capacitor is connected to the base electrode of a transistor 116. The anode of the diode 112 is connected to one terminal of a resistor 118, the other terminal of which is grounded. The capacitor 114 may have a value of .005 microfarads, and the resistor 118 may have a value of 7.5 kilo-ohms. The diode 112 may be a silicon type such as designated at present as a "601–C." The transistor 116 may be a N-P-N type like the transistor 94, such as is presently designated as "2N104."

The common junction between the capacitor 114 and the base electrode of the transistor 116 is connected to the common junction between a pair of resistors 120 and 122. These resistors are connected as a voltage divider between the −20 volt voltage source and ground. The resistor 120 may have a value of 68 kilo-ohms and the resistor 122 may have a value of 10 kilo-ohms. A resistor 124 is connected between the emitter electrode of the transistor 116 and ground, and this resistor is shunted by a capacitor 126. The resistor 124 may have a value of 3.3 kilo-ohms, and the capacitor 126 may have a value of 5 microfarads. The collector electrode of the transistor 116 is electrically coupled through a resistor 128 of, for example, 15 kilo-ohms to the −20 volt voltage source.

The amplified pulses from the transistor amplifier 94 are applied to the cathode of the diode 112. These pulses have a negative polarity and are sufficiently negative in amplitude to overcome the negative voltage on the anode of the diode. The anode of the diode 112 has a negative voltage as a result of the self-biasing action inherent to crystal diodes. Because of the negative bias on the anode of the diode 112, the diode serves to block the succeeding stages of the system from noise and other extraneous interference. However, the amplified pulses applied to the cathode of the diode 112 have sufficient negative amplitude so that the diode breaks sharply into its conductive state upon the occurrence of each such pulse. The amplified pulses from the transistor 94 are again sharpened in the input circuit of the transistor 116 and are again amplified by the latter transistor.

The pulses from the transistor 116 are applied with negative polarity to the base electrode of a transistor 130. The transistor 130 may also be a N-P-N type, such as is presently designated as "2N104." This latter transistor is connected as an emitter follower for power gain. The collector of the transistor 130 is connected to the negative terminal of the −20 volt source. A pair of series-connected resistors 132 and 134 are connected between the emitter of the transistor 130 and ground. The resistor 132 may have a value of 820 ohms and the resistor 134 may have a value of 3.3 kilo-ohms. The negative-going amplified pulses from the transistor 130 appear, therefore, as positive-going high power pulses across the resistors 132 and 134.

The common junction between the resistors 132 and 134 is connected to one terminal of a resistor 136 having a value of, for example, 8.2 kilo-ohms. A capacitor 138 couples the other terminal of the resistor 136 to the anode of a diode 140. The capacitor 138 may have a value of .1 microfarads, and the diode 140 may be of the type designated "1N100." A resistor 142 is connected between the common junction of the capacitor 138 and anode of the diode 140 and ground. This resistor may have a value of 47 kilo-ohms. The cathode of the diode 140 is connected to the base electrode of a transistor 144 in the multivibrator 22. This transistor may be of the N-P-N type and may be of the type presently designated "2N140."

A resistor 145 is connected between the base of the transistor 144 and the terminal of a negative voltage source. This terminal may have a potential of −24 volts and is preferably independent of the −20 volt source. This is so that the triggering of the multivibrator will not affect the stability of the −20 volt source. The resistor 145 may have a value of, for example, 200 kilo-ohms. The emitter of the transistor 144 is connected to ground, and the collector of the transistor is connected to a resistor 148 which, in turn, is connected to the −24 volt source. The resistor 148 may have a value of 7.5 kilo-ohms. A resistor 150 is connected between the collector of the transistor 144 and the base electrode of a transistor 146. This latter resistor may have a value of 15 kilo-ohms.

Another 15 kilo-ohm resistor 152 is connected between the base of the transistor 146 and a positive biasing source, which may be of the order of 1.5 volts. The transistor 146 is also included in the circuit of the multivibrator 22, and it may be a N-P-N "2N104" type. A capacitor 154 couples the base of the transistor 144 to the collector of the transistor 146. The capacitor 154 has a value of .005 microfarads. The emitter of the transistor 146 is grounded, as is the emitter of the transistor 144. A resistor 156 having a value of, for example, 3.3 kilo-ohms is connected between the collector of the transistor 146 and one terminal of the relay-energizing winding 26. The other terminal of this winding is connected to the negative terminal of the −24 volt source. The winding 26 is shunted by a capacitor 158.

The transistors 144 and 146 and the diode 140 are included in a mono-stable multivibrator circuit corresponding to the multivibrator 22 of Figure 1. The multivibrator has a stable state in which the transistor 144 is conductive and the transistor 146 is non-conductive. Since the transistor 146 is non-conductive, current cannot flow through a circuit including the voltage source, the resistance 145, the capacitance 154 and the transistor. Current also cannot flow through a circuit including the voltage source, the relay 26, the resistance 156 and the transistor 146.

The introduction of a positive pulse to the anode of the diode 140 in excess of a minimum threshold value causes that diode to conduct. This, in turn, causes the multivibrator circuit to be triggered to its astable state in which the transistor 144 becomes non-conductive. Since the transistor 144 becomes non-conductive, current cannot flow through a circuit including the voltage source, the resistor 148 and the transistor 144. Because of the lack of any current flow through the resistor 148, a negative voltage approaching that from the source is produced on the collector of the transistor 144. This voltage is introduced to the base of the transistor 146 to make the transistor conductive. When the transistor 146 becomes conductive, current flows through a circuit including the voltage source, the resistor 145, the capacitor 154 and the transistor 146. This current causes the capacitor 154 to become charged to a negative potential by the negative potential from the voltage source.

As the capacitor 154 becomes charged, a negative potential of increasing magnitude is introduced to the base of the transistor 144. At a particular negative potential, the transistor 144 becomes conductive. This causes current to flow through a circuit including the voltage source, the resistor 148 and the transistor 144. Because of the voltage drop across the resistor 148, a potential approaching ground is introduced to the base of the transistor 146 to cut off the transistor.

In this way, the multivibrator 22 remains in its astable state as represented by the conductance of the transistor 146 only for a particular time after a positive pulse is introduced to the transistor 144. However, if a second positive pulse having a particular amplitude is introduced to the base of the transistor 144 before the transistor 144 can become conductive, the charge across the capacitor 154 becomes neutralized. This causes a new cycle of operation to be initiated for charging the capacitance 154 in a direction for cutting off the transistor 144 and making the transistor 146 conductive. By periodically introducing positive pulses to the transistor 144 in this manner, the transistor 146 is maintained conductive.

Because the relay energizing winding 26 is included in the collector circuit of the transistor 146, this relay winding is energized whenever the multivibrator is triggered to its astable state to obtain a flow of current through the transistor 146. In the manner described, the positive-going pulses appearing across the resistor 134 (which are shown by the curve "C" of Figure 2) hold the multivibrator circuit in the astable state so long as the amplitude of these pulses exceeds the triggering threshold of the multivibrator 22. This triggering threshold is established by the flow of current through a circuit including the resistance 142, the diode 140, the resistance 145 and the voltage source. Because of the flow of current through this circuit, the plate of the diode 140 becomes biased at a negative voltage which establishes the triggering threshold of the multivibrator 22. This triggering threshold is indicated by a horizontal line 300 in the curve C shown in Figure 2.

As previously described, the amplitude of the pulses produced across the resistor 134 exceeds the triggering threshold of the multivibrator 22 during the time that the oscillator 10 produces signals having an amplitude exceeding a particular value. This causes positive pulses to be periodically introduced to the base of the transistor 144 at a sufficiently high frequency such that the multivibrator 22 is maintained in its astable state of operation. However, whenever the amplitude of the positive pulses across the resistor 134 falls below the triggering threshold of the multivibrator 22, the multivibrator returns to its stable state.

The pulses produced across both the resistors 132 and 134 are impressed on the input circuit of the multivibrator 24, which is formed by the circuits associated with a pair of transistors 160 and 162. Since the circuits of the transistors 160 and 162 may be identical to the circuits of the transistors 144 and 146, the multivibrator 24 need not be described in detail.

In the circuit of the multivibrator 24, the energizing relay winding 32 is included in the collector circuit of the transistor 162. The multivibrator 24 may be biased to the same trigger threshold as the multivibrator 22. However, the pulses fed to the multivibrator 24 have a higher amplitude than those fed to the multivibrator 22 since the multivibrator 24 receives the pulses produced across the resistances 132 and 134 whereas the multivibrator 22 receives the pulses produced across only the resistance 134. Because of this, the multivibrator 24 is maintained in its astable condition by the pulses from the resistances 132 and 134 during the time that the multivibrator 22 is being triggered between its stable and astable states as a result of the input pulses of variable amplitude produced across the resistance 134.

The multivibrator 24, therefore, is provided with a reference potential to maintain the relay winding 32 energized during the absence of any vehicle and thereby to maintain electrical continuity between the servomotor terminal "B" and the terminal "B" of the alternating-current source 30. Then, the sudden drop in the amplitude of the pulses in the presence of a vehicle in the magnetic field of the tank coil 12 causes the relay winding 32 to become de-energized. The relay winding 32 becomes de-energized because of the interruption in the introduction of triggering pulses to the multivibrator 24 and the resultant return of the multivibrator to the stable state of operation as represented by a flow of current through the transistor 160. This, in turn, causes the relay switch 34 to de-activate the servomotor 18 and to activate the indicator and counter unit 35.

Therefore, the action of the control incorporated in the system regulates the system against response to slow changes in parameters. These changes in parameters may be the result of temperature or moisture effects on the tank coil 12 of the oscillator. Moreover, the aging of the transistors and diodes used in the system and the temperature variation effects on these transistors also produce changes in circuit parameters. By providing a servo action as described above, the adjustment of the system and the response of the indicator and counter unit 35 remains independent of changes in circuit parameters and of changes in ambient conditions. The system, moreover, remains in perfect balance and adjustment and without the need for attention and responds only to substantial and relatively rapid changes in the oscillator output voltage across the tank coil 12. These substantial changes result from the presence of a vehicle.

As noted above, it is desirable that the exciting direct voltage sources for the transistors be highly stabilized. Stabilized direct voltage sources are well known and need not be described in detail here. As also indicated, it is preferable that the multivibrators 22 and 24 derive their exciting direct voltage from a separate source so that the triggering action of these multivibrators will have no adverse effect on the stability of the direct voltage supplied to the remainder of the circuit. Separate sources are not shown in the drawings for purposes of simplification. The 1.5 volt positive bias voltage for the multivibrator circuit can be obtained in any known manner, for example, by placing a resistor in the ground return lead of one of the power supplies.

The diode 140 and the equivalent diode in the multivibrator 24 perform a blocking function in addition to the functions described above. When the multivibrator 22 is triggered into its astable state by the introduction of positive pulses to the base of the transistor 144, pulses of large amplitude and of the same polarity are fed back through the capacitor 154. This results in part from the flow of current through a circuit including the capacitor 154 and the resistor 145 and the resultant positive voltage produced across the resistor. Without the diode 140, these pulses would be fed back to the multivibrator 24. Normally they would not have an adverse effect on the multivibrator 24 since the multivibrator is being maintained in its astable state by the pulses of high amplitude produced across the resistors 132 and 134. However, such pulses might trigger the multivibrator 24 in the presence of a vehicle if the diode 140 were not included in the circuit. Furthermore, pulses fed back from the multivibrator 24 might effectively trigger the multivibrator 22 at times when no triggering is desired, if a diode corresponding to the diode 140 were not included in the multivibrator 24. This would be so either in the presence or absence of a vehicle.

A positive bias is applied to the base of the transistor 146 through the resistor 152 and to the base of the transistor 162 through a corresponding resistor to produce temperature compensation. This voltage varies with temperature to maintain the triggering threshold of the multivibrators at a constant level. In this way, the transistor 144 in the multivibrator 22 is conductive in the stable state of the multivibrator regardless of the ambient temperature since the positive bias on the base of the transistor 146 prevents the transistor from being normally conductive. The positive bias introduced to the base of the transistor 162 is instrumental in a similar manner to maintain the multivibrator 24 in the stable state of operation.

Under some conditions, it may be desirable to eliminate the potentiometer 90 in the bias control for the peak detector 16. The reason for this is that this potentiometer may be subjected to excessive wear. This potentiometer may, for example, be replaced by the system and apparatus shown in Figure 4.

The system of Figure 4 includes a transistor 200 which is connected, for example, as a 5 kilocycle Colpitts oscillator. This transistor may be a N-P-N type and may be of the type presently designed as a "2N104." A resistor 202 is connected between the emitter of the transistor and ground, and a capacitor 204 is connected between the base of the transistor and ground. The resistor 202 may have a value of 1 kilo-ohm, and the capacitor 204 may have a value of 2 microfarads. A voltage source represented by a battery 206 has its positive terminal connected to ground. A resistor 208 having a value of, for example, 100 kilo-ohms is connected between the negative terminal of the voltage source and the base electrode of the transistor.

The tank coil 210 of the oscillator excites a pair of magnetic circuits in a manner to be described. A pair of capacitors 212 and 214 are series connected across the tank coil. The capacitor 212 may have a value of .05 microfarad, and the capacitor 214 may have a value of .1 microfarad. The common junction between the capacitors 212 and 214 is connected to the emitter of the transistor 200.

The circuit described above is similar to the oscillator 10 described previously, and the circuit is connected as a Colpitts oscillator so that oscillations are established across the tank coil 210 and so that an oscillatory current flows in the tank coil. As noted above, the frequency of the oscillator may be of the order of 5 kilocycles. The source 206 may, for example, be a mercury cell capable of supplying current of the order of 100 microamperes.

A first core 216 of magnetic laminated material is provided, and this first core has the configuration of a rectangular-shaped closed loop. A second core 218 of laminated magnetic material is also provided and this second core has a U-shaped configuration. The cores 216 and 218 are placed in side-by-side relationship, and the tank coil 210 is wound around the two adjacent legs of these cores in the illustrated manner.

The servomotor 18 in this latter embodiment drives a threaded shaft 220 which extends through an internally threaded stationary bracket 222. A disk-shaped member 224 of magnetic material is mounted on the end of the shaft 220. When the servomotor 18 is driven in one direction, the disk-shaped member 220 is moved toward the open end of the U-shaped member 218 to close the air gap in the magnetic circuit of that member. Alternately, when the servomotor 18 is rotated in the opposite direction, it moves the disk 224 away from the open end of the U-shaped core 218 to increase the air gap in its magnetic circuit.

Two separate magnetic circuits are, therefore, excited by the tank coil 210 of the oscillator. The reluctance in the magnetic circuit formed by the core 216 is made extremely low so that the variation of the air gap in the magnetic circuit formed by the core 218 does not change the excitation current requirements to any material extent. The reluctance of the magnetic circuit formed by the core 218 and the magnetic disk 224 is made relatively large, at least when the disk is separated from the core by a considerable distance. The reluctance of the magnetic circuit formed by the core 218 and the magnetic disk 224 is dependent upon the relative distance between the core and the disk.

A coil 226 is wound around the outer leg of the U-shaped core 218. As the air gap in the magnetic circuit formed by the core 218 is varied by moving the disk 224 back and forth, the oscillatory voltage developed across the coil 226 is correspondingly varied. One side of the coil 226 is grounded, and the other side of this coil is connected to the anode of a diode 228 which is included in a rectifier stage. A capacitor 230 is connected between the cathode of the diode 228 and ground.

The base of a transistor 232 such as of the N-P-N type has a common terminal with the cathode of the diode 228. The collector of the transistor 232 has a common connection with the conduit 52 shown in Figure 3. A connection is made from the emitter of the transistor 232 to one terminal of a resistance 234 having its other terminal grounded and to one terminal of the resistor 86 also shown in Figure 3. The other terminal of the resistor 86 is connected to the capacitance 96 and to the plate of the diode 80 as shown in Figure 3.

The oscillatory voltage across the coil 226 is rectified and filtered by the diode 228 and the capacitor 230 so that a direct voltage is supplied to the diode 80 for biasing purposes. The diode 228 is so poled that this bias voltage has a negative polarity, this being the desired polarity for biasing the diode 80. Therefore, the control of the servomotor 18 by the multivibrator 22 in the modification of Figure 4 now causes the threaded shaft 220 to move the disk 224 back and forth relative to the core 218. This effectively varies the air gap in the magnetic circuit of the core. This in turn causes the voltage induced in the coil 226 to vary such that the desired variation of the bias voltage for the diode 80 is produced. Since there are no rubbing parts in the members actually producing the voltage, the system and apparatus of Figure 4 is capable of extremely long usage.

The invention provides, therefore, a new and improved presence detector system which is capable of long and trouble-free unattended operation. The system of the invention in the described manner is insensitive to variations in circuit parameters or in ambient conditions, and it maintains itself in perfect adjustment for the detection and indication of passing electrically conductive objects such as vehicles. Although the system of the invention has been described expressly in the environment of a vehicle detector, it will be apparent to those skilled in the art that the system can be used whenever it is desired to detect the presence of a metallic object.

We claim:

1. A system for detecting the presence of a metallic object, including, an oscillator having a tank coil across which an oscillatory output signal is developed, said tank coil being positionable to induce a voltage in the movable object for a change in the inductive characteristics of the tank coil, means connected to the oscillator for maintaining a substantially constant flow of current through said oscillator even with changes in the characteristics of the tank coil to produce in said oscillator voltages corresponding to the changes in the characteristics of the tank coil, and means responsive to changes in the voltages in said oscillator to indicate the presence of the moving object.

2. A system for detecting the presence of a metallic object, including, an oscillator having a tank coil across which an oscillatory output signal is developed, said tank coil being positionable to obtain a change in the "Q" of said coil upon a movement of the object into the vicinity of the coil and to obtain the change in the "Q" of the circuitry of said coil in a direction for a decrease in amplitude of said oscillatory output signal, means responsive to considerable decreases in the amplitude of said oscillatory output signal to indicate the presence of such electrically conductive material, and control means operative upon said oscillatory signal for rendering said responsive means insensitive to minor changes in the amplitude of said oscillatory output signal.

3. A system for detecting the presence of a movable object, including, an oscillator having a tank coil across which an oscillatory output signal is developed, said tank coil being positionable upon a movement of the object into the vicinity of the coil to induce a voltage in the movable object for a considerable change in the amplitude of said oscillatory output signal in accordance with the induction of the voltage, indicator means for providing an indication in response to an applied input signal, means responsive to considerable changes in the amplitude of said oscillatory output signal to obtain the application of an input signal to said indicator means, and control means for rendering said responsive means substantially insensitive to minor changes in the amplitude of said oscillatory output signal.

4. A system for detecting the presence of an object, including, an oscillator having a tank coil across which an oscillatory output signal is developed, said tank coil being positionable for magnetic coupling to the object upon the movement of the object into the vicinity of the tank coil, first control means coupled to said tank coil for maintaining substantially constant current flow in said tank coil to obtain a considerable decrease in the amplitude of said oscillatory output signal upon such induction of voltage in the movable object, means for providing an indication in response to an applied input signal, means responsive to considerable decreases in the amplitude of such oscillatory output voltage to obtain the application of an input signal to said indicator means, and second control means for rendering said responsive means insensitive to minor changes in the amplitude of said oscillatory output signal.

5. A system for detecting the presence of an object, including, an oscillator having a tank coil across which an oscillatory output signal is developed, said tank coil being positionable for the induction of a voltage in the object upon a movement of the object into the vicinity of the tank coil to obtain considerable changes in the amplitude of such oscillatory signal in accordance with the induction of the voltage, a detector responsive to said oscillatory output signal to produce a sequence of pulses having an amplitude related to the amplitude of such oscillatory signal, means for providing an indication in response to an applied input signal, means responsive to considerable changes in the amplitude of the pulses from said detector to obtain the application of an input signal to said indicator means, and control means coupled to said detector and responsive to the pulses from said detector to maintain the amplitude of said pulses substantially constant upon the occurrence of minor changes in the amplitude of said oscillatory output signal.

6. A system for detecting the passage of vehicles, including, an oscillator having a tank coil across which an oscillatory output voltage is developed, said tank coil being positionable adjacent the path of the vehicle to obtain variations in the "Q" of the tank coil in accordance with the passage of the vehicle, means for obtaining changes in the amplitude of such oscillatory output voltage in accordance with the variations in the "Q" of the circuitry of the tank coil, peak detector means responsive to the amplitude of said oscillatory output voltage to produce a sequence of output pulses having amplitudes related to the amplitude of said oscillatory output voltage, variable biasing means including said peak detector means for adjusting the operating characteristics of said detector means to control the amplitude of said output pulses from said detector means, means responsive to changes in the amplitude of the output pulses from said detector means to provide an output indication, and control means coupled to said variable biasing means and responsive to said output pulses from said detector means for adjusting the operation of said variable biasing means to obtain a stabilization of the amplitude of said pulses over relatively long periods of time in the absence of the movement of any vehicle in the path adjacent to the tank coil.

7. The system defined in claim 6 in which said control means includes a mono-stable trigger circuit having a stable and an astable state of operation, means controlled by said trigger circuit for adjusting the operation of said variable biasing means to obtain an increase in the amplitude of said output pulses when said trigger circuit is in its stable operating state and to obtain a decrease in the amplitude of said output pulses when said trigger circuit is in its astable operating state, and means for introducing said output pulses to said trigger circuit to maintain said trigger circuit in the astable operating state only when the amplitude of said output pulses exceeds a pre-selected threshold level.

8. The system defined in claim 6 in which said control means includes a rotatable servomotor for adjusting the operation of said variable biasing means in a direction dependent upon the direction of rotation of said motor, a relay for controlling the introduction of energy to said motor to obtain a rotation of said motor in one direction when said relay is in an energized condition and to obtain a rotation of said motor in an opposite direction when said relay is in a deenergized condition, a mono-stable trigger circuit having stable and astable states of operation, the trigger circuit being coupled to said relay to energize said relay when said trigger circuit is in the astable operating state, and means for introducing said output pulses to said trigger circuit to maintain said trigger circuit in the astable state only when the amplitude of said output pulses exceeds a particular value.

9. The system defined in claim 6 in which said control means include a rotatable servomotor for adjusting the operation of said variable biasing means in a direction dependent upon the direction of rotation of said motor, a first relay for controlling the introduction of energy to said motor to obtain a rotation of said motor in one direction when said relay is in an energized condition and to obtain a rotation of said motor in an opposite direction when said relay is in a deenergized condition, a mono-stable trigger circuit having stable and astable states of operation, the trigger circuit being coupled to said relay to energize said relay when said trigger circuit is in its astable state, and means for introducing said output pulses to said trigger circuit to maintain said trigger circuit in the astable state only when the amplitude of said output pulses exceeds a pre-selected value; and in which said responsive means include an indicator responsive to an applied activating signal to indicate the movement of the object past the tank coil, a second relay for selectively controlling the introduction of energy to said indicator and to said servomotor, a second mono-stable trigger circuit having stable and astable states of operation, the second trigger circuit being operative to maintain said second relay in a state of operation to obtain the introduction of energy to said indicator and to prevent the introduction of energy to said servomotor when said second multivibrator is in its stable operating condition, and means for introducing said output pulses to said second trigger circuit to maintain said second trigger circuit in its astable operating condition so long as the amplitude of said output pulses exceeds the preselected value.

10. A system for detecting the presence of a movable object, including, means for producing an output signal having considerable changes in characteristics upon the movement of the object into the presence of the signal means, means responsive to considerable changes in the characteristics of said output signal to indicate the movements of the objects into the presence of the signal means, and servo means responsive to the output signal to maintain the characteristics of such signed substantially constant upon the occurrence of minor changes in the parameters of the system.

11. A system for detecting the presence of a movable object, including, means for producing an output signal having a considerable change in amplitude upon the movement of the object into the vicinity of such signal means, means responsive to considerable changes in the amplitude of such output signal to indicate the movements of the objects into the vicinity of the signal means, a trigger circuit having first and second states of operation, means controlled by said trigger circuit and operative upon the output signal to increase the amplitude of said output signal when said trigger circuit is in its first operating state and to decrease the amplitude of said output signal when said trigger circuit is in its second operating state, and means for introducing said output signal to said trigger circuit to maintain said trigger circuit in the second operating state only when the amplitude of said output signal exceeds a pre-selected value.

12. A system for detecting the presence of a movable object, including, means for producing an output signal having a considerable change in amplitude upon the movement of the object into coupled relationship with such signal means, means responsive to considerable changes in the amplitude of such output signal to indicate the movement of the object into coupled relationship with the signal means, a servomotor electrically coupled to the signal means to change the amplitude of said output signal in a first direction when said servomotor operates in a first direction and to change the amplitude of said output signal in a second direction opposite to the first direction when said servomotor operates in a second direction opposite to the first direction, a relay for providing for the introduction of energy to the motor to obtain an operation of said motor in the first direction when said relay is in an energized condition and to obtain an operation of said motor in the second direction when said relay is in a deenergized condition, a trigger circuit having first and second operating states and coupled to said relay to energize said relay when said trigger circuit is in its first operating state, and means for introducing said output signal to said trigger circuit to maintain said trigger circuit in the second operating state only when the amplitude of said output signal is different in the second direction from a particular value.

13. A system for detecting the presence of a movable object, including, means for producing alternating signals having first characteristics in the absence of the object and having second characteristics upon the movement of the object into the vicinity of the signal means, first means including servo means responsive to the alternating signals for maintaining the first characteristics in the alternating signals in the absence of the object, second means responsive to changes in the alternating signals from the first characteristics to the second characteristics to produce output signals, means responsive to the output signals to render the first means inoperative during the production of the output signals, and means responsive to the output signals to provide output indications.

14. A system for detecting the presence of a movable object, including, means including electrical circuitry for producing alternating signals having a first amplitude in the absence of the object and having a second amplitude upon the movement of the object into the vicinity of the signal means, electrical circuitry including servo means responsive to the alternating signals in the absence of the object to stabilize the amplitude of the alternating signals at the first level, means including electrical circuitry responsive to the changes in the amplitude of the alternating signals from the first level to the second level to produce an output signal, means responsive to the output signals from the signal means to interrupt the electrical circuitry to the servo means during the production of the output signals, and means responsive to the output signals to produce output indications.

15. A system for detecting the presence of a movable object, including, means for producing alternating signals having a first amplitude in the absence of the object and having a second amplitude upon the bringing of the object and the signal means together, means for detecting the amplitude of the alternating signals to produce an output signal upon the occurrence of changes in the amplitude of the alternating signals from the first amplitude to the second amplitude, means including servo means responsive to the amplitude of the alternating signals to stabilize the operation of the detecting means at a particular level in the absence of the object to facilitate a detection of the changes in the amplitude of the alternating signals from the first amplitude to the second amplitude, and means for providing an indication of the output signals produced by the detecting means.

16. A system for detecting the presence of a movable object, including, means including electrical circuitry for producing alternating signals having a first amplitude in the absence of the object and having a second amplitude upon the bringing of the object and the signal means together, means including electrical circuitry for detecting the amplitude of the alternating signals to produce output signals upon a change in the amplitude of the alternating signals from the first level to the second level, servo means including electrical circuitry for stabilizing the operation of the detecting means in the absence of the object to facilitate a detection of the changes in the amplitude of the alternating signals from the first level to the second level, means including electrical circuitry for interrupting the operation of the servo means upon the production of output signals by the detecting means, and means for providing an indication of the output signals produced by the detecting means.

17. A system for detecting the presence of a movable object, including, a tank coil having a first inductance in the absence of the object and having a second inductance upon the bringing of the object and the tank coil into the same vicinity, an oscillator including the tank coil for providing alternating signals, means including the oscillator for maintaining a substantially constant current through the oscillator to produce in the oscillator a voltage having first and second amplitudes related to the first and second inductances of the tank coil, means for detecting the amplitude of the alternating voltage to produce pulses having amplitudes related to the amplitude of the alternating voltage, a servomotor coupled to the detecting means to control the operation of the detecting means in producing pulses, means responsive to the amplitude of the pulses from the detecting means to control the operation of the servomotor in obtaining pulses of substantially constant amplitude during the production of the alternating voltage of the first amplitude, means for providing output indications, and means responsive to the pulses from the detecting means to prevent any energizing of the indicating means during the production of the pulses of substantially constant amplitude and to produce an energizing of the indicating means upon the occurrence of pulses having an amplitude related to the oscillatory voltage of second amplitude.

18. A system for detecting the presence of a movable object, including, means for providing for the production of control signals with first characteristics in the absence of the object and for providing for the production of control signals with second characteristics upon the movement of the object into the vicinity of the signal means, means for providing for the production of first signals upon a change in the control signals in a first direction from the first characteristics and for providing for the production of second signals upon a change in the control signals in a second direction from the first characteristics, a first relay having first and second states of operation and coupled to the last mentioned means for operation in the first state upon the production of the first signals and for operation in the second state upon the production of the second signals, a second relay having first and second states of operation, servo means included in a circuit with the first relay and the second relay to receive energy for its operation with the first relay in the first and second states and with the second relay in the first state and to have an interruption in the introduction of energy with the second relay in the second state of operation and coupled to the control signal means for an adjustment in the operation of the control signal means to maintain the first characteristics in the control signal in the absence of the movable objects, means responsive to the control signals to provide a first state of operation upon the occurrence of the first characteristics in the control signals and to provide a second state of operation upon the occurrence of the second characteristics in the control signals and coupled to the second relay to produce in the second relay a state of operation corresponding to its own state of operation, and means connected in a circuit with the second relay in the second state of operation of the relay to provide an output indication.

19. A system for detecting the presence of a movable object, including detecting means for producing a signal having characteristics dependent upon the disposition of the movable object relative to the detecting means, servo means responsive to slow changes in parameters in the vicinity of the detecting means for maintaining particular characteristics in the signal from the detecting means in the absence of the movable object from the vicinity of the detecting means, and means coupled to the detecting means for providing an output indication upon changes in the characteristics of the signal from the detecting means for movements of the object into the vicinity of the detecting means.

20. A system for detecting the presence of a movable object, including detecting means responsive to the movable object for producing signals having first particular characteristics in the absence of the object and having second particular characteristics different from the first particular characteristics in the presence of the object, servo means coupled to the detecting means and responsive to slow variations in parameters for maintaining the signals produced by the detecting means at the first particular characteristics in the absence of the movable object, and means including indicating means responsive to the signals of second characteristics from the detecting means for providing an indication as to the presence of the movable object.

21. A system for detecting the presence of a movable object, including detecting means responsive to the movable object for providing signals having a first voltage level in the absence of the movable object and for providing signals having a second voltage level different from the first voltage level upon a movement of the object into the vicinity of the detecting means, servo means coupled to the detecting means and responsive to changes in parameters in the vicinity of the detecting means other than the movements of the object into the vicinity of the detecting means for maintaining the first voltage level in the signals from the detecting means in the absence of the movable object, means operative upon the production of the second voltage level in the signals from the detecting means for producing an output indication, and means responsive to the signals from the detecting means and coupled to the servo means for disabling the servo means upon the production of signals of the second voltage level by the detecting means.

22. A system for detecting the presence of a movable object, including detecting means including electrical circuitry for producing an electrical signal having an amplitude dependent upon the disposition of the movable object relative to the detecting means, electrical servo means responsive to slow changes in parameters in the vicinity of the detecting means for maintaining a particular amplitude in the electrical signal from the detecting means in the absence of the movable object from the vicinity of the detecting means, electrical indicating means coupled to the detecting means for providing an output indication upon changes in the amplitude of the signal from the detecting means as a result of a movement of the object into the vicinity of the detecting means, and electrical circuitry coupled to the servo means and responsive to the signal from the detecting means for decoupling the servo means from the detecting means upon the production of signals having an amplitude for providing an output indication.

23. A system for detecting the presence of a movable object, including magnetic detecting means having a first inductive response in the absence of the movable object and having a second inductive response in the presence of the movable object, electrical detecting means coupled to the magnetic detecting means for producing signals having first characteristics upon the first inductive response and for producing signals having second characteristics upon the second inductive response, electrical servo means coupled to the electrical detecting means upon the occurrence of the first inductive response for maintaining the first characteristics in the electrical signals from the detecting means to compensate for variations in different parameters, and electrical circuitry coupled to the electrical detecting means for decoupling the servo means from the electrical detecting means upon the occurrence of the second characteristics in the electrical signals from the detecting means.

24. A system for detecting the presence of a movable object, including a tuned circuit including an inductive reactance having first characteristics in the absence of the movable object and having second characteristics in the presence of the movable object, signal means including the tuned circuit and including a source of constant current for producing alternating signals having a first amplitude upon the occurrence of the first characteristics in the inductive reactance and having a second amplitude upon the occurrence of the second characteristics in the inductive reactance, electrical servo means coupled to the signal means for maintaining the first amplitude in the alternating signals upon the occurrence of the first characteristics in the inductive reactance, electrical circuitry coupled to the signal means for providing an output indication upon the occurrence of the second amplitude in the alternating signal, and electrical circuitry coupled to the signal means and the servo means for preventing the servo means from affecting the amplitude of the alternating signal upon the occurrence of the second amplitude in the alternating signal.

25. A system for detecting the presence of a movable object, including means for providing a voltage level representing a reference, means coupled to the reference means in the absence of the movable object for maintaining the reference level at a particular value and operative to become decoupled from the reference means in the presence of the movable object, signal means coupled to the reference means and operative in the presence of a movable object for producing a signal having a level different by a particular polarity from the reference level, and indicating means responsive to the reference level and to the signal from the signal means for producing an output indication upon the occurrence of the particular polarity in the signal relative to the reference level.

26. A system for detecting the presence of a movable object, including detecting means responsive to the movable object for producing signals having a first amplitude in the absence of the movable object and for producing signals having a second amplitude in the presence of the movable object, means for providing a reference voltage at a particular level and coupled to the detecting means for maintaining the reference voltage at the particular level in the absence of the movable object, output means responsive to the reference voltage for providing for the passage of signals of only the second amplitude, and indicating means responsive to the passage of signals through the output means for providing an indication as to the presence of the movable object.

27. A system for detecting the presence of a movable object, including means including an inductive reactance responsive to the movable object for producing a signal having a first amplitude in the absence of a movable object and for producing a signal having a second amplitude in the presence of the movable object, electrical servo circuitry including a first multivibrator responsive to the signal of the first amplitude from the first mentioned means for stabilizing the signal at the first amplitude in the absence of the movable object, electrical circuitry including a second multivibrator responsive to the stabilized signal of first amplitude for providing a bias level to pass only the signals of the second amplitude, and means including electrical circuitry responsive to the passage of the signal of the second amplitude through the last mentioned circuitry for providing an output indication.

References Cited in the file of this patent

UNITED STATES PATENTS 2,488,815   Hailes _____ Nov. 22, 1949